United States Patent [19]

Ballard et al.

[11] 4,234,653
[45] Nov. 18, 1980

[54] PROTECTIVE COATING

[75] Inventors: Norman E. Ballard; Frank Cork, both of Derby; Philip H. Andrews, Solihull; Francis Chappell, Halesowen, all of England

[73] Assignee: Rolls-Royce Limited, London, England

[21] Appl. No.: 800,016

[22] Filed: May 24, 1977

Related U.S. Application Data

[63] Continuation of Ser. No. 607,993, Aug. 26, 1975, abandoned.

[30] Foreign Application Priority Data

Aug. 31, 1974 [GB] United Kingdom ............ 38149/74

[51] Int. Cl.³ .................. B32B 5/16; B32B 15/20; B32B 17/06
[52] U.S. Cl. ................................ 428/328; 428/428; 428/432; 428/433; 428/427; 428/454; 428/450; 428/469; 428/472; 427/376.3; 427/376.4; 427/383.7; 106/49; 106/290; 106/297

[58] Field of Search ............. 428/432, 433, 469, 472, 428/328, 427, 454, 428, 450; 260/42.22; 427/90, 192, 193, 376, 383, 376 B, 376 C, 383 C; 106/1, 48, 49

[56] References Cited

U.S. PATENT DOCUMENTS

| | | | |
|---|---|---|---|
| 3,484,284 | 12/1969 | Dates et al. | 106/1 |
| 3,746,568 | 7/1973 | Rybarczyk | 106/1 |
| 3,748,170 | 7/1973 | Michael | 428/433 X |
| 3,884,705 | 5/1975 | Blair | 106/1 |
| 4,006,279 | 2/1977 | Robinson | 428/432 |

*Primary Examiner*—George F. Lesmes
*Assistant Examiner*—Alexander S. Thomas
*Attorney, Agent, or Firm*—Cushman, Darby & Cushman

[57] ABSTRACT

A heat resistant protective coating for a metal surface comprises a glass matrix having at least 50 percent by weight of finely divided metallic particles dispersed therein. The coating is produced by covering the metal surface with a mixture containing 40 to 60% by weight of finely divided metallic particles, 17 to 40% by weight of a ceramic frit and from 10 to 18% by weight of an organic resin, and heating the thus coated surface in air to burn off the organic resin and fuse the frit.

7 Claims, No Drawings

PROTECTIVE COATING

This is a continuation of application Ser. No. 607,993 filed Aug. 26, 1975, now abandoned.

This invention relates to a heat resistant protective coating and to a method of applying such a coating to a metal surface.

According to the present invention, a heat resistant protective coating for a metal surface comprises a glass matrix having at least 50 percent by weight of finely divided metallic particles being substantially chemically non-reactive with respect to each other.

Throughout this specification, the term 'glass' is to be understood as meaning an inorganic material that has been produced by fusion and subsequent cooling, the cooled fused mass thereof having become rigid without crystallising.

The finely divided metallic particles are preferably within the size range 5 to 10 microns. We have found that if particles of over 10 microns diameter are used, the resultant coating tends to have a rough surface finish.

Protective coatings in accordance with the present invention may be electrically conductive, thereby causing them to impart galvanic resistance to corrosion to any metal surface upon which they have been deposited. We have found that this corrosion resistance may be increased if the coating contains a small amount of at least one metal chromate, such as zinc chromate, strontium chromate or barium chromate.

The maximum temperature a given coating in accordance with the present invention will withstand is governed by the fusion temperature of its glass matrix. We have found, for instance, that if a coating is required to withstand temperatures of up to 500° C. for a prolonged period of time, a glass having a fusion temperature of about 550° C. may be used as the matrix material. A lead borate glass which comprises a eutectic of $PbO-B_2O_3$, the eutectic containing 84% by weight of PbO, is an example of a glass having a fusion temperature of about 550° C. which could be used as a matrix material in coatings in accordance with the present invention.

If a lead borate glass of the type described is used as a matrix material, we prefer that the metallic particles dispersed therein are of aluminium.

According to a further aspect of the present invention, a method of applying a heat resistant protective coating to a metal surface comprises coating the metal surface with a composition comprising 40 to 60% by weight of finely divided metallic particles, 17 to 40% by weight of a ceramic frit and from 10 to 18% by weight of an organic resin, and heating the coated metal surface in air to a temperature sufficiently high to burn off the organic resin and fuse the ceramic frit.

According to a still further aspect of the present invention, a coating composition for use in the method of the present invention comprises 40 to 60% by weight of finely divided metallic particles, 17 to 40% by weight of a ceramic frit and from 10 to 18% by weight of an organic resin.

A ceramic frit is to be understood as being a ceramic composition that has been fused, quenched to form a glass, and then granulated.

Said finely divided metallic particles are preferably within the particle size range 5 to 10 microns.

Said ceramic frit preferably comprises particles of less than 20 microns diameter.

Said finely divided metallic particles are preferably of aluminium.

Said ceramic frit preferably comprises lead borate.

An organophilic cation modified clay may be added to the coating composition in order to assist in maintaining the particulate content of the composition in suspension. Dimethyldioctadecyl ammonium montmorillonite is an example of such a clay.

The coating composition may be applied to the metal surface to be coated by such conventional methods as brushing, dipping or spraying. However, we prefer to apply the composition to the metal surface by electrophoresis. Electrophoretic application helps to ensure that even metallic surfaces of complex geometrical shape can be provided with a smooth, uniform film of the composition.

A suitable diluent may be added to the coating composition in order to ensure that the composition is of a suitable viscosity for the particular method chosen for applying it to a metal surface.

If the coating composition is to be applied to a metal surface by electrophoresis then the preferred diluent is water.

If water is used as the diluent, then the organic resin in the coating composition must be one which is water dispersible. Water dispersible acrylic or epoxy resins are examples of such resins. In general, if the coating composition is to be applied electrophoretically, we prefer to add sufficient water to the coating composition to give it a viscosity of 30 to 40 seconds when measured with a British Standard No. 4 Flow Cup. Coating compositions of such viscosity may be applied electrophoretically to a metal surface using a voltage range of 30 to 100 volts for periods of from 30 seconds to 2 minutes.

A preferred coating composition for application to a metal surface by electrophoresis is one which contains 17% by weight of a water dispersible acrylic resin, 50% by weight of finely divided aluminium particles and 33% by weight of a lead borate ceramic frit.

The heat treatment of the metallic surface after coating with the coating composition is determined by the fusing characteristics of the particular ceramic frit used in the coating composition. Thus we have found that if a lead borate frit is used, heating of the coated metal surface to a temperature in the range 400° to 600° C. for 1 to 2 hours is sufficient to burn off the resin and fuse the frit. If, however, it is not desired to fuse the frit immediately after coating, the coated surface may be heat treated at a temperature sufficiently high enough to only cure the resin. The thus treated coating would be consequently resistant to handling damage. We have found that if the coating composition contains a water dispersible acrylic resin, then a heat treatment of 20 minutes to one hour at 120° to 150° C. is sufficient to cure the resin.

Preferably, a metal surface which is to be provided with a protective coating in accordance with the present invention is abrasive blasted with clean 120/220 grade aluminium oxide particles prior to coating in order to ensure a good bond between the coating and the surface. If such abrasive blasting is not possible, as in the case of plated surfaces, then the surface is preferably chemically etched prior to coating. For instance, we have found that a 30 second immersion in an etching solution containing 70% V/V hydrochloric acid of specific gravity 1.6, 20% V/V nitric acid of specific gravity 1.42 and 10% V/V of ferric chloride liquor of specific gravity 1.45 is sufficient to etch nickel plated on to titanium.

The following examples will serve to illustrate the present invention.

EXAMPLE 1

A titanium based alloy test piece plated with nickel was etched for 30 seconds in a etching solution containing:
Hydrochloric Acid: 70% V/V S.G. 1.6
Nitric Acid: 20% V/V S.G. 1.42
Ferric Chloride Liquor: 10% V/V S.G. 1.45

The test piece was then rinsed in hot water and allowed to dry.

The test piece was then immersed in a bath containing the following constituents:
Synocryl 841/S Resin—200 grams
5-10 micron Aluminium Powder—300 grams
Lead Borate Ceramic Frit—200 grams
Distilled Water—200 grams Synocryl 841/S resin is a water dispersed acrylic resin containing 50% solids, obtainable from Messrs. Cray Valley Products.

The Lead Borate ceramic frit comprised a eutectic of $PbO-B_2O_3$ containing 84% by weight of PbO. The following oxides were also present in the frit as minor constituents: $SiO_2$, $Al_2O_3$, $Na_2O$, $K_2O$ and $SnO_2$. The frit particles were less than 20 microns in diameter.

Electrodes were placed in the bath and connected together with the test piece, to an electrical source. The electrodes were connected so as to act as cathodes and the test piece connected so as to act as an anode. A potential difference of 50 volts was then applied between the anode and cathodes for 30 seconds. This resulted in the electrophoretic deposition of a coating containing ceramic frit, aluminium powder and resin on the test piece surface.

The test piece was then removed from the bath and heated, in air, at a temperature of 120° C. for 20 minutes so as to cure the resin and render the test piece readily handlable.

The test piece was subsequently heated at a temperature of 450° C. for 2 hours in air so as to burn off the resin and fuse the ceramic frit.

The resultant coating was found to be electrically conductive and 0.0004 to 0.0005 inches thick.

The test piece was then tested for corrosion resistance by heating in air for 2 hours at 450° C. followed by exposure to a salt spray for 22 hours. This cycle was repeated 3 times without any apparent corrosion occurring in the coated regions of the test piece.

EXAMPLE 2

A titanium based alloy test piece plated with nickel and etched for 30 seconds in an etching solution having the same composition as that quoted in Example 1.

After rinsing in hot water followed by drying the test piece was immersed in a bath containing the following constituents:
Synocryl 841/S Resin—200 grams
5-10 micron Aluminium Powder—300 grams
Dimethyldioctadecyl Ammonium Montmorillonite—12 grams
Lead Borate Ceramic Frit—66 grams
Zinc Chromate—22 grams
Distilled Water—266 grams Electrodes were placed in the bath and connected, together with the test piece, to an electrical source. The electrodes were connected so as to act as cathodes and the test piece connected so as to act as an anode. A potential difference of 50 volts was then applied between the anode and cathodes for 30 seconds.

The test piece was then removed from the bath and heated, in air, at a temperature of 120° C. for 20 minutes so as to cure the resin and render the test piece readily handlable.

The test piece was subsequently heated at a temperature of 450° C. for 2 hours in air so as to burn off the resin and fuse the ceramic frit.

The resultant coating was found to be electrically conductive and 0.0004 inches to 0.0005 inches thick.

The test piece was then tested to corrosion resistance by heating in air for 2 hours at 450° followed by exposure to a salt spray for 22 hours. This cycle was repeated 5 times without any apparent corrosion occurring in the coated regions of the test piece.

It will be appreciated that as the thus formed coating is electrically conductive, further coatings in accordance with the present invention could be applied on top of it by the electrophoretic method of application.

We claim:

1. A metal article having thereon a heat-resistant protective coating, said coating consisting essentially of:
   (a) a glass matrix which has as its major constituent, a eutectic of $PbO-B_2O_3$ and contains about 84% by weight of PbO;
   (b) from about 50 to about 78% by weight of aluminum particles in the size range of 5 to 10 microns dispersed in said glass matrix; and
   (c) a metal chromate selected from the group consisting of zinc chromate, strontium chromate, barium chromate and mixtures thereof, and
   (d) an organophilic cation modified clay; the glass matrix and aluminum particles being substantially chemically non-reactive with respect to each other.

2. A coated metal article having a heat resistant electrically conductive protective coating thereon consisting essentially of a lead borate glass having finely divided aluminum particles dispersed therein,
   the aluminum particles present in the amount of about 50-79% by weight of the glass and having a particle size in the range of about 5-10 microns.
   the electrically conductive coating imparting galvanic resistance from corrosion to the coated metal surface,
   the glass and aluminum particles dispersed therein being substantially chemically nonreactive with respect to each other.

3. The coated metal article of claim 2 wherein the coating also contains a metal chromate selected from the group consisting of zinc chromate, strontium chromate, barium chromate or mixtures thereof, thereby ehancing the corrosion resistance of said coating.

4. A heat-resistant coated metal article having a heat resistant electrically conductive protective coating thereon consisting essentially of a glass matrix material containing therein finely-divided aluminum particles within the size range of 5-10 microns, the aluminum particles present to the extent of about 50-78% by weight of the total glass matrix solids, the glass and dispersed aluminum particles being substantially chemically non-reactive with respect to each other.

5. The metal article having thereon a heat resistant protective coating as claimed in claim 4, wherein said coating further contains a metal chromate.

6. The metal article having thereon a heat resistant coating as claimed in claim 5 wherein said metal chromate is selected from the group consisting of zinc chromate, strontium chromate, barium chromate and mixtures thereof.

7. The metal article having thereon a heat resistant protective coating as claimed in claim 4 wherein said glass matrix comprises a eutectic of $PbO$-$B_2O_3$, as a major constituent, the eutectic containing 84% by weight of PbO.

* * * * *